United States Patent
Tan et al.

(10) Patent No.: US 9,926,472 B2
(45) Date of Patent: Mar. 27, 2018

(54) COMPOSITION

(71) Applicant: Addivant Switzerland GmbH, Reinach (CH)

(72) Inventors: Siren Tan, Manchester (GB); Xing Zuo, Manchester (GB); Jonathan Hill, Manchester (GB)

(\*) Notice: Subject to any disclaimer, the term of this patent is extended or adjusted under 35 U.S.C. 154(b) by 80 days.

(21) Appl. No.: 15/030,376

(22) PCT Filed: Oct. 17, 2014

(86) PCT No.: PCT/EP2014/072379
§ 371 (c)(1),
(2) Date: Apr. 18, 2016

(87) PCT Pub. No.: WO2015/055852
PCT Pub. Date: Apr. 23, 2015

(65) Prior Publication Data
US 2016/0280970 A1    Sep. 29, 2016

(30) Foreign Application Priority Data
Oct. 18, 2013    (GB) .................................. 1318489.0

(51) Int. Cl.
| | | |
|---|---|---|
| *C09J 11/06* | (2006.01) | |
| *C08K 5/13* | (2006.01) | |
| *C08K 5/36* | (2006.01) | |
| *C08K 5/52* | (2006.01) | |
| *C09J 123/12* | (2006.01) | |
| *C08K 5/00* | (2006.01) | |
| *C08K 5/372* | (2006.01) | |
| *C08K 5/53* | (2006.01) | |

(52) U.S. Cl.
CPC ................. *C09J 11/06* (2013.01); *C08K 5/13* (2013.01); *C08K 5/36* (2013.01); *C08K 5/52* (2013.01); *C09J 123/12* (2013.01); *C08K 5/005* (2013.01); *C08K 5/372* (2013.01); *C08K 5/53* (2013.01)

(58) Field of Classification Search
CPC ........... C09J 11/06; C09J 123/12; C08K 5/13; C08K 5/36; C08K 5/52; C08K 5/005; C08K 5/372; C08K 5/53
USPC ......................................................... 524/108
See application file for complete search history.

(56) References Cited

U.S. PATENT DOCUMENTS

| | | | |
|---|---|---|---|
| 4,820,757 A * | 4/1989 | Spang ................. | C07D 235/24 524/103 |
| 4,835,200 A | 5/1989 | St. Clair | |
| 5,128,397 A * | 7/1992 | Horsey ................. | C08K 5/005 524/101 |
| 5,149,741 A | 9/1992 | Alper et al. | |
| 8,623,480 B2 | 1/2014 | Davis | |
| 2004/0241474 A1* | 12/2004 | Domine ................... | B32B 7/12 428/500 |
| 2008/0251195 A1* | 10/2008 | Malofsky .................. | C09J 5/00 156/275.5 |
| 2012/0159867 A1 | 6/2012 | Reeve et al. | |
| 2012/0165455 A1 | 6/2012 | Vitrano et al. | |
| 2012/0328805 A1 | 12/2012 | Davis | |
| 2012/0329353 A1 | 12/2012 | Davis et al. | |
| 2013/0060215 A1 | 3/2013 | Knutson et al. | |
| 2013/0186566 A1 | 7/2013 | Lotz et al. | |

FOREIGN PATENT DOCUMENTS

| | | | | |
|---|---|---|---|---|
| CN | 102250563 | | 11/2011 | |
| CN | 102250563 A | * | 11/2011 | .............. C09J 11/06 |
| WO | WO2012159867 A1 | | 5/2012 | |

OTHER PUBLICATIONS

CN102250563A—machine translation.*
Patent Cooperation Treaty International Search Report for International Application No. PCT/EP2014/072379, dated Jul. 9, 2015.
Written Opinion of the International Search Authority for International Application No. PCT/EP2014/072379, dated Aug. 24, 2015.
International Application No. PCT/EP2014/072379, filed Oct. 17, 2014.
International Bureau of World Intellectual Property Organization, International Preliminary Report on Patentability of PCT/EP2014/072379, dated Apr. 28, 2016, 9 pages, Geneva, Switzerland.

* cited by examiner

*Primary Examiner* — Ling Choi
*Assistant Examiner* — Ronald Grinsted
(74) *Attorney, Agent, or Firm* — D'Hue Law LLC; Cedric A. D'Hue

(57) ABSTRACT

There is provided a stabilizing composition for hot melt adhesives, the composition comprising: a first stabilizing component comprising at least one phenolic antioxidant; a second stabilizing component comprising at least one phosphite antioxidant; and a third stabilizing component comprising at least one antioxidant containing a sulphur group having the formula —CH2-(S)x-CH2-, wherein x=1 or 2, and wherein neither of the —CH2- groups is directly bonded to an aromatic group.

34 Claims, No Drawings

COMPOSITION

CROSS-REFERENCE TO RELATED APPLICATIONS

This application is a U.S. national phase filing of a PCT international patent application number PCT/EP2014/072379, with a filing date of Oct. 17, 2014, which in turn claims the benefit of British patent application serial number 1318489.0, filed Oct. 18, 2013, the disclosures of which are expressly incorporated by reference.

FIELD

The present invention relates to stabilising compositions for hot melt adhesives. More particularly, but not exclusively, the invention relates to stabilising compositions for polymeric hot melt adhesives.

BACKGROUND

Hot melt adhesives are used in a wide variety of applications, such as sealing packaging, labelling articles and product assembly.

Hot melt adhesives are well known in the art and can be formed from polyolefins, for example polyethylene and polypropylene, styrenic copolymers, for example styrene-butadiene-styrene and styrene-ethylene/butylene-styrene, polyamides, polyurethanes, polyesters, polycarbonates, acrylics, ethylene vinyl acetate and compatible mixtures and/or copolymers of two or more thereof.

Notable properties of hot melt adhesives include surface energy, tack, set time, melt flow, melt viscosity, gel content, skin formation and colour stability. It is important that hot melt adhesives maintain these properties during storage, handling and subsequent application. In particular, it is important that the colour, viscosity, and minimal gel and skin formation are maintained during prolonged exposure to heat, which is common in hot melt adhesive applications.

To aid colour retention, additives are usually added to hot melt adhesives. The additives will typically comprise phenolic antioxidants, phosphite antioxidants, or combinations thereof.

To help prevent gel formation it is known to add anti-gel agents to hot melt adhesives, for example polyethylene glycols, polyethylene oxides and ethoxylated linear alcohols.

US 2012/0328805 describes a hot melt adhesive composition that includes a non-functionalized amorphous poly alpha olefin polymer, a second polymer selected from the group including propylene homopolymers, propylene copolymers and combinations thereof, a functionalized wax and a second wax. In addition to these components, the document describes antioxidants which may be present in the composition. These antioxidants are high molecular weight hindered phenols, in particular Irganox® 1010 and Irgafos® 168, multifunctional phenols and phosphites.

US 2012/0329353 describes a hot melt adhesive composition that includes a non-functionalized metallocene catalysed polymer and a second polymer selected from the group including amorphous poly alpha olefins, uni-modal metallocene catalysed polymers, hydrogenated styrenic block copolymers and combinations thereof. In addition to these components, the document describes antioxidants which may be present in the composition. These antioxidants are high molecular weight hindered phenols, in particular Irganox® 1010 and Evernox® 76, multifunctional phenols and phosphites.

WO 2012/159867 describes a wax-containing hot melt adhesive comprising 1 to 40% of a styrenic block copolymer, 3 to 15% of a modified thermoplastic elastomer comprising —COO— groups, and 5 to 25% of a wax. In addition to these components, the document describes antioxidants which may be present in the hot melt adhesive. These antioxidants are high molecular hindered phenol, in particular Irganox® 1010 and Irganox® 1076, sulphur or phosphorous containing phenol and UV absorbers.

US 2013/0060215 describes a hot melt adhesive composition including a semi-crystalline copolymer of propylene and a polyethylene wax. Additionally, the document describes antioxidants which may be present in the composition. These antioxidants are hindered phenols, in particular Irganox® 1010.

US 2012/0165455 describes a hot melt adhesive formulation utilising a blend of polymers which includes a polyolefin polymer and an olefinic block copolymer. The adhesive formulation typically includes a stabiliser or antioxidant selected from high molecular weight phenols, multifunctional phenols, thiodipropionate esters and phosphites.

US 2013/0186566 describes a hot melt adhesive for bonding a film/foil selected from metal film, metal foil, paper film, paper foil, plastic film or plastic foil, wherein the hot melt adhesive comprises 10 to 80% of at least one thermochemically degraded polypropylene copolymer, 5 to 60% of at least one tackifying resin, 0 to 40% of at least one further additive, wherein the hot melt adhesive has a Shore D hardness above 50 measured in accordance with DIN EN ISO 868:2003. The further additive may be a stabiliser selected from hindered phenols and multifunctional phenols such as sulphur- or phosphorous-containing phenols, in particular Irganox® 1010.

U.S. Pat. No. 4,835,200 describes a hot melt adhesive composition containing a block copolymer prepared using a bromide based coupling agent, a tackifying resin, and an effective amount of a stabilisation composition. The stabilisation composition contains a thio compound, a phenolic antioxidant, a tris-(nonylated phenyl) phosphite, and an aliphatic compatible epoxy compound. The thio compound specifically described is 2,4-bis-(n-octylthio)-6-(4-hydroxy-3,5-di-t-butyl anilino)-1,3,5-triazine (Irganox® 565—CAS 991-84-4).

U.S. Pat. No. 5,128,397 describes a hot melt adhesive composition based on ethylene-vinyl acetate copolymer and a hydrocarbon tackifying resin and containing a stabilizer system of a hindered phenol antioxidant, a phosphite costabilizer and an acid scavenger.

U.S. Pat. No. 5,149,741 describes a hot melt construction adhesive which includes an SIS copolymer containing at least about 25% styrene, a compatible tackifying resin, a plasticizing oil and an effective amount of a stabilizer.

However, there are numerous disadvantages associated with the prior art constructions, namely, discolouration, gel formation, skin formation and changes in viscosity, particularly when the hot melt adhesives are exposed to heat for prolonged periods of time.

SUMMARY

According to a first aspect of the present invention, there is provided a stabilising composition for hot melt adhesives, the composition comprising:

(a) a first stabilising component comprising at least one phenolic antioxidant;
(b) a second stabilising component comprising at least one phosphite antioxidant; and
(c) a third stabilising component comprising at least one antioxidant containing a sulphur group having the formula —$CH_2$—$(S)_x$—$CH_2$—, wherein x=1 or 2, and wherein neither of the —$CH_2$— groups is directly bonded to an aromatic group.

The third stabilising component may have the formula R—$CH_2$—$(S)_x$—$CH_2$—R, wherein each R group, which may be the same or different, is or contains, independently, an aliphatic group. Where more than one such aliphatic group is present in either or each R group, the aliphatic groups may be the same or different.

The, each or any aliphatic group may be straight or branched chain and may be substituted with one or more functional groups.

The stabilising composition may additionally comprise a fourth stabilising component comprising at least one acid scavenger.

The stabilising composition is formulated to be compatible with one or more polymeric base materials to form a stabilised hot melt adhesive composition in accordance with the invention.

The inventors of the present invention have surprisingly found that the presence of stabilising component (c) and optionally at least one acid scavenger in the stabilising composition dramatically improves the colour retention of the hot melt adhesive to which it is added, particularly during prolonged heat exposure. Additionally, it has been found that the stabilised hot melt adhesive has little or no skin formation or gel formation and retains its viscosity, particularly during prolonged heat exposure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

By 'prolonged heat exposure' we mean exposure to a temperature of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C. or at least about 250° C., for at least about 1 hour, at least about 2 hours, at least about 4 hours, at least about 6 hours, at least about 12 hours, at least about 24 hours, at least about 36 hours, at least about 48 hours, at least about 3 days, at least about 4 days, at least about 5 days, at least about 6 days, at least about 7 days, at least about 10 days or at least about 14 days.

A hot melt adhesive stabilised by the stabilising composition of the present invention and optionally at least one acid scavenger has improved resistance to discolouration during prolonged heat exposure, compared to known stabilised hot melt adhesives which do not comprise stabilising component (c) and optionally and acid scavenger.

Without wishing to be bound by any such theory, it is believed that gels are small regions of high molecular weight polymers or loosely cross-linked polymers. Gel formation is detrimental to the appearance and/or functionality of hot melt adhesives, thus, it is beneficial to reduce or eliminate gel formation.

Gel formation may be determined using a method varied from ASTM D4499, involving heating the stabilised hot melt adhesive in an oven with controlled air flow, to a temperature of 170° C. or 200° C. After heating for a certain period of time, for example 3 days or 7 days, a fine fibre is drawn from the sample and visually inspected. This may be done by scooping out a portion of the molten sample with a spoon and slowly pouring it from a height onto a laboratory bench. A smooth and fine drawn fibre indicates that no gel formation has occurred.

Preferably there is no gel formation in a hot melt adhesive stabilised by the stabilising composition of the present invention after 7 days at a temperature of 170° C. Preferably there is no gel formation in a hot melt adhesive stabilised by the stabilising composition of the present invention after 3 days at a temperature of 200° C.

The reduction in discolouration and gel formation during prolonged exposure to heat is advantageous since hot melt adhesives are often kept in a molten state for prolonged periods of time during production and prior to use in an application, for example in a glue gun.

In addition to the advantages discussed above, a hot melt adhesive stabilised by the stabilising composition of the present invention retains its viscosity, in particular during prolonged heat exposure. Viscosity of the stabilised hot melt adhesive is determined using the ASTM D 4499-07 test method.

Preferably the stabilised hot melt adhesive retains at least 60%, at least 65%, at least 70%, at least 75%, at least 80%, at least 85%, at least 90%, at least 95%, at least 98% or at least 99% of its viscosity after 7 days at a temperature of 170° C. Preferably the stabilised hot melt adhesive retains at least 60%, at least 65%, at least 70%, at least 75%, at least 80%, at least 85%, at least 90%, at least 95%, at least 98% or at least 99% of its viscosity after 3 days at a temperature of 200° C.

Stabilising component (a) may comprise one or more hindered phenolic antioxidants. Each hindered phenolic antioxidant may for example comprise tetrakismethylene(3,5-di-t-butyl-4-hydroxyhydrocinnamate) methane (Anox® 20—CAS 6683-19-8); 2,2'thiodiethylene bis[3(3,5-di-t-butyl-4-hydroxyphenyl)propionate] (Anox® 70—CAS 41484-35-9); C13-C15 linear and branched alkyl esters of 3-(3'5'-di-t-butyl-4'-hydroxyphenyl) propionic acid (Anox® 1315—CAS 171090-93-0); octadecyl 3-(3',5'-di-t-butyl-4'-hydroxyphenyl) propionate (Anox® PP18—CAS 2082-79-3); 1,3,5-tris(3,5-di-t-butyl-4-hydroxybenzyl) isocyanurate (Anox® IC14—CAS 27676-62-6); 1,3,5-trimethyl-2,4,6-tris(3,5-di-t-butyl-4-hydroxybenzyl)benzene (Anox® 330—CAS 1709-70-2); N,N'-hexamethylene bis[3-(3,5-di-t-butyl-4-hydroxyphenyl)propionamide] (Lowinox® HD98—CAS 23128-74-7); 1,2-bis(3,5-di-t-butyl-4-hydroxyhydrocinnamoyl)hydrazine (Lowinox® MD24—CAS 32687-78-8); C9-C11 linear and branched alkyl esters of 3-(3',5'-di-t-butyl-4'-hydroxyphenyl)propionic acid (Naugard PS48®—CAS 125643-61-0); triethyleneglycol-bis-[3-(3-t-butyl-4-hydroxy-5-methylphenyl)propionate] (Lowinox® GP45—CAS 36443-68-2); the butylated reaction product of p-cresol and dicyclopentadiene (Lowinox® CPL—CAS 68610-51-5); 2,2'methylenebis(6-t-butyl-4-methylphenol) (Lowinox® 22M46—CAS 119-47-1); 2,2'-ethylidenebis[4,6-di-t-butylphenol] (Anox® 29—CAS 35958-30-6); butylated hydroxytoluene (BHT—CAS 128-37-0); and/or compatible mixtures of two or more thereof.

One particularly preferred stabilising component (a) comprises tertakismethylene (3,5-di-t-butyl-4-hydroxyhydrocinnamate) methane (Anox® 20—CAS 6683-19-8).

Stabilising component (a) may be present in an amount of from about 0.1% to about 1% by weight of stabilised hot melt adhesive. Preferably, stabilising component (a) is present in an amount of from about 0.2% to about 0.4% by weight of stabilised hot melt adhesive.

Stabilising component (b) may comprise one or more organophosphite antioxidants.

Each organophosphite antioxidant may for example comprise bis(2,4,di-t-butylphenyl)pentaerythritol diphosphite (Ultranox® 626—CAS 26741-53-7); 2,4,6-tri-tert-butylphenyl-2-butyl-2-ethyl-1,3-propanediol phosphite (Ultranox® 641—CAS 161717-32-4); tris(2,4-di-t-butylphenyl) phosphite (Alkanox® 240—CAS 31570-04-4); tetrakis (2,4-di-t-butylphenyl)4,4'-biphenylene diphosphonite (Alkanox® 24-44—CAS 38613-77-3); tris(4-n-nonylphenyl) phosphite (TNPP—CAS 26523-78-4); tris(mono-nonylphenyl)-phosphite; distearylpentaerythritol diphosphite (Weston® 618—CAS 3806-34-6); bis(2,4-dicumylphenyl) pentaerythritol diphosphite (Doverphos® 9228-CAS 154862-43-8); Weston® 705—CAS 939402-02-5; tris (dipropyleneglycol) phosphite, $C_{18}H_{39}O_9P$ (Weston® 430—CAS 36788-39-3); poly(dipropylene glycol) phenyl phosphite (Weston® DHOP—CAS 80584-86-7); diphenyl isodecyl phosphite, $C_{22}H_{31}O_3P$ (Weston® DPDP—CAS 26544-23-0); phenyl diisodecyl phosphite (Weston® PDDP—CAS 25550-98-5); heptakis (dipropyleneglycol) triphosphite (Weston® PTP—CAS 13474-96-9); tris(4-n-nonylphenyl) phosphite (Weston® TNPP CAS 26523-78-4); bis(2,6-di-ter-butyl-4-methylphenyl)pentaerythritol diphosphite (PEP 36—CAS 80693-00-1); and/or compatible mixtures of two or more thereof.

Each organophosphite antioxidant preferably exhibits a good balance between hydrostability and reactivity. Such organophosphite antioxidants may include non-hindered triaryl phosphites; low-hindered triaryl phosphites, for example tris(4-n-nonylphenyl)phosphite (TNPP—CAS 26523-78-4); alkylaryl phosphites, for example bis (2,4-di-t-butylphenyl)pentaerythritol diphosphite (Ultranox® 626—CAS 26741-53-7); and trialkyl phosphites, for example distearylpentaerythritol diphosphite (Weston® 618—CAS 3806-34-6).

Additionally or alternatively, it may be preferable for each organophosphite antioxidant not to comprise a fully hindered triaryl phosphite, for example tris(2,4-di-t-butylphenyl)phosphite (Alkanox® 240—CAS 31570-04-4). Fully hindered triaryl phosphites may exhibit an unacceptably low level of reactivity, which is likely due to their high steric hindrance.

One particularly preferred stabilising component (b) comprises bis(2,4,di-t-butylphenyl)pentaerythritol diphosphite (Ultranox® 626—CAS 26741-53-7).

Stabilising component (b) may be present in an amount of from about 0.1% to about 1% by weight of stabilised hot melt adhesive, preferably from about 0.4% to about 0.7% by weight of stabilised hot melt adhesive.

Stabilising component (c) may comprise at least one antioxidant containing a sulphur group having the formula —$CH_2$—$(S)_x$—$CH_2$—, wherein x=1.

Stabilising component (c) may comprise one or more thioesters. In this context, by 'thioester' we mean a compound comprising both a thio group and an ester group, as opposed to a —C(=O)—SR group.

Each thioester may comprise for example dilauryl-3,3'-thiodipropionate (Naugard® DLTDP—CAS 123-28-4); distearyl-3,3'-thiodipropionate (Naugard® DSTDP—CAS 693-36-7); ditridecylthiodipropionate (Naugard® DTDTDP (liquid) CAS-10595-72-9); 2,2'thiodiethylene bis[3(3,5-di-t-butyl-4-hydroxyphenyl)propionate] (Anox® 70—CAS 41484-35-9); dimyristyl thiodipropionate (Cyanox® MTDP—CAS 16545-54-3); distearyl-disulfide (Hostanox® SE 10—CAS 2500-88-1); ADK STAB AO-23 (CAS 77538-55-7); and/or compatible mixtures of two or more thereof.

One particularly preferred stabilising component (c) comprises pentaerythritol tetrakis (β-laurylthiopropionate) (Naugard® 412S—CAS 29598-76-3).

Stabilising component (c) may be present in an amount of from about 0.1% to about 1% by weight of stabilised hot melt adhesive, preferably from about 0.4% to about 0.7% by weight of stabilised hot melt adhesive.

A key factor in the amount of stabilising component (c) required is the amount of sulphur present in the stabilising component (c) i.e. the sulphur content. The higher the sulphur content, the lower the amount of stabilising component (c) required.

Pentaerythritol tetrakis (3-laurylthiopropionate) (Naugard® 412S—CAS 29598-76-3) is a particularly preferred stabilising component since it has a high sulphur content, approximately 11% by relative molar mass. Thus, a lower amount of the stabilising component may be required to stabilise a hot melt adhesive.

Where stabilising component (c) comprises pentaerythritol tetrakis (β-laurylthiopropionate) (Naugard® 412S—CAS 29598-76-3), it may be present in an amount of from about 0.1% to about 1% by weight of stabilised hot melt adhesive, preferably from about 0.4% to about 0.7% by weight of stabilised hot melt adhesive.

The inventors of the present invention have surprisingly found that a stabilising composition comprising at least one antioxidant containing a sulphur group having the formula —$CH_2$—$(S)_x$—$CH_2$— wherein x=1 or 2, and wherein neither of the —$CH_2$— groups is directly bonded to an aromatic group, has a greater stabilising effect compared to a stabilising composition comprising a sulphur-containing antioxidant wherein one or both of the —$CH_2$— groups is directly bonded to an aromatic group, or wherein one or both of the sulphur atoms are directly bonded to an aromatic group, for example 2,4-bis-(n-octylthio)-6-(4-hydroxy-3,5-di-tert-butylanilino)-1,3,5-triazine (Irganox® 565—CAS 991-84-4).

In some embodiments, stabilising component (a) may contain a sulphur group having the formula —$CH_2$—$(S)_x$—$CH_2$—, wherein x=1 or 2, and wherein neither of the —$CH_2$— groups is directly bonded to an aromatic group, for example 2,2'thiodiethylene bis[3(3,5-di-t-butyl-4-hydroxyphenyl)propionate] (Anox® 70—CAS 41484-35-9). Where this is the case, the amount of stabilising component (c) in the stabilising composition may be significantly reduced.

By 'significantly reduced' we preferably mean that the amount of stabilising component (c) may be reduced by 1% or more, 5% or more, 10% or more, 20% or more, 30% or more, 40% or more, 50% or more, 60% or more, 70% or more, or 80% or more.

However, it has been found that stabilising component (c) should still be present in the stabilising composition in some amount, albeit optionally in a significantly reduced amount.

As previously mentioned, the stabilising composition of the present invention may further comprise a fourth stabilising component comprising at least one acid scavenger.

The acid scavenger may be selected from epoxidised oils, metal salts of fatty acids, metal oxides, metal hydroxides, metal carbonates, metal salts and hydrotalcite-like compounds. The epoxidised oil may be selected from epoxidised castor oil, epoxidised sunflower oil, epoxidised linseed oil and epoxidised soy bean oil. Preferably the epoxidised oil is epoxidised soy bean oil. The metal salts of fatty acids may include calcium stearate, zinc stearate and magnesium stearate. Preferably the salt is calcium stearate. The metal oxide/hydroxide/carbonate/salt may be selected from calcium oxide, zinc oxide, calcium hydroxide, calcium carbonate, calcium lactate and zinc octanoate. The hydrotalcite-like compound may be a magnesium aluminium hydroxide carbonate hydrate, for example, DHT-4A—CAS 11097-59-9.

The acid scavenger may be present in an amount of from about 100 to about 5000 ppm of the stabilised hot melt adhesive composition. Preferably the acid scavenger is present in an amount of from about 200 to about 4000 ppm, from about 300 to about 3000 ppm, from about 400 to about 2000 ppm, from about 500 to about 1500 ppm, from about 600 to about 1400 ppm, from about 700 to about 1300 ppm, from about 800 to about 1200 ppm or from about 900 to about 1100 ppm of the stabilised hot melt adhesive composition.

One preferred ratio of the stabilising components (a):(b):(c) is 1:3:3, optionally with 1000 ppm of acid scavenger.

The stabilising composition may be in solid form, for example the stabilising composition may comprise tertakismethylene (3,5-di-t-butyl-4-hydroxyhydrocinnamate) methane (Anox® 20—CAS 6683-19-8), bis(2,4,di-t-butylphenyl)pentaerythritol diphosphite (Ultranox® 626—CAS 26741-53-7), pentaerythritol tetrakis (β-laurylthiopropionate) (Naugard® 412S—CAS 29598-76-3) and an acid scavenger, for example DHT-4A—CAS 11097-59-9, calcium stearate or epoxidised soya bean oil.

Alternatively, the stabilising composition may be in liquid form, for example the stabilising composition may comprise C13 to C15 linear and branched alkyl esters of 3-(3',5'-di-t-butyl-4'-hydroxyphenyl) propionic acid (Anox® 1315—CAS 171090-93-0, Weston® 705—CAS 939402-02-5, ditridecylthiodipropionate (Naugard® DTDTDP (liquid) CAS—10595-72-9) and epoxidised soya bean oil.

According to a second aspect of the present invention, there is provided a stabilised hot melt adhesive comprising a polymeric base material and a stabilising composition comprising:
(a) a first stabilising component comprising at least one phenolic antioxidant;
(b) a second stabilising component comprising at least one phosphite antioxidant; and
(c) a third stabilising component comprising at least one antioxidant containing a sulphur group having the formula $-CH_2-(S)_x-CH_2-$, wherein x=1 or 2, and wherein neither of the $-CH_2-$ groups is directly bonded to an aromatic group.

Stabilising component (c) may comprise at least one antioxidant containing a sulphur group having the formula $-CH_2-(S)_x-CH_2-$, wherein x=1.

The stabilised hot melt adhesive may additionally comprise a fourth stabilising component comprising at least one acid scavenger.

The polymeric base material may comprise a polyolefin. The polyolefin may comprise a homopolymer of ethylene, propylene, butylene or a higher alkene. The ethylene homopolymer may comprise low density polyethylene (LDPE) and/or high density polyethylene (HDPE). The propylene homopolymer may be isotactic, syndiotactic or atactic.

Additionally or alternatively, the polyolefin may comprise a copolymer of ethylene, propylene and/or butylene. The copolymer may be a random copolymer or a block copolymer. For example, the polyolefin may comprise an ethylene/propylene block copolymer, an ethylene/propylene random copolymer, an ethylene/propylene/butylene random terpolymer or an ethylene/propylene/butylene block terpolymer.

Preferably the polyolefin comprises a propylene homopolymer and/or copolymer.

Polyolefin hot melt adhesives provide a good moisture barrier, are non-toxic and provide chemical resistance against polar solvents. Furthermore, polyolefin hot melt adhesives have low surface energies which result in good wetting of a diverse range of metals and polymeric plastics, including polypropylene.

Additionally or alternatively, the polymeric base material may comprise a styrenic block copolymer, for example styrene-butadiene-styrene (SBS), styrene-isoprene-styrene (SIS), styrene-ethylene/butylene-styrene (SEBS), styrene-ethylene/propylene (SEP) and styrene-butadiene rubber (SBR); or suitable mixtures and blends thereof.

Additionally or alternatively, the polymeric base material may comprise an ethylene vinyl acetate polymer, for example EVA.

Polymeric base materials such as polyurethanes, polyamides, polyesters, polycarbonates and acrylics may also be the subject of this invention.

The stabilised hot melt adhesive may be substantially free from anti-gel agents, for example polyethylene glycols, polyethylene oxides and ethoxylated linear alcohols. Preferably the stabilised hot melt adhesive comprises less than 5 wppm of anti-gel agents, more preferably less than 2 wppm of anti-gel agents and most preferably no anti-gel agents. For the avoidance of doubt, stabilising components (a) to (c) and the acid scavenger are not considered anti-gel agents as used in this context.

The stabilised hot melt adhesive of the present invention may be used in numerous applications and may be capable of bonding wood, metal, polymeric plastics, glass and textiles.

More specifically, the stabilised hot melt adhesives may be used in the packaging and converting applications for example in case, carton, box, bag and tray forming and for sealing packaging.

The stabilised hot melt adhesive of the present invention may also be used in graphic arts applications, for example spine glues for book-binding of paper; construction applications, for example rigid panel lamination and profile wrapping of wood and plastics, furniture and windows; foot wear applications, for example bonding polymers in shoe soles; general assembly applications, for example the assembly of plastic components for industrial use; automotive applications, for example headlamp bonding of plastic components and interior trim applications involving a variety of substrates such as textiles and fabrics; textile bonding applications, for example textile lamination of breathable membranes for out door clothing; and/or consumer applications, for example adhesives and sealants for use in the home for decoration and repair.

For the avoidance of doubt, all features relating to the first aspect of the invention also relate to the second aspect of the invention and vice versa.

The invention is more specifically described by the following non-limiting examples.

EXAMPLES

Example 1

Different stabilising compositions were blended into unstabilised hot melt adhesives to form stabilised hot melt adhesive compositions.

The unstabilised hot melt adhesives had the following compositions:
A: polypropylene-based low viscous hot melt adhesive
B: polypropylene-based medium viscous hot melt adhesive Table 1 shows the different antioxidants (AOs) that were used.

TABLE 1

| Phenolic AO | Phosphite AO | Sulphur AO | Acid Scavenger | |
|---|---|---|---|---|
| 520 Irganox$^{RTM}$ 1520 | 240 Alkanox$^{RTM}$ 240 | 412s Naugard$^{RTM}$ 412s | DHT | DHT-4A |
| A20 Anox$^{RTM}$ 20 | 626 Ultranox$^{RTM}$ 626 | | Drapex ® | ESBO |
| IC14 Anox$^{RTM}$ IC14 | | | CaSt | calcium stearate |
| | | | CaO | calcium oxide |
| | | | ZnO | zinc oxide |

Table 2 shows the various stabilised hot melt adhesives that were prepared.

Samples 1, 2, 3, 4, 5, 7 and 15 were comparative tests.

TABLE 2

| Sample | Unstabilized HMA | Phenolic AO Stabiliser | % | Phosphite AO Stabiliser | % | Sulphur AO Stabiliser | % | Acid Scavenger Stabiliser | % | % AO (excluding acid scavenger) |
|---|---|---|---|---|---|---|---|---|---|---|
| 1 (comp) | A | 520 | 2 | — | — | — | — | — | — | 2 |
| 2 (comp) | A | A20 | 2 | — | — | — | — | — | — | 2 |
| 3 (comp) | A | A20 | 1 | 240 | 1 | — | — | — | — | 2 |
| 4 (comp) | A | A20 | 0.5 | 626 | 1.5 | — | — | — | — | 2 |
| 5 (comp) | A | A20 | 1 | — | — | 412s | 1 | — | — | 2 |
| 6 | A | A20 | 0.5 | 626 | 0.75 | 412s | 0.75 | — | — | 2 |
| 7 (comp) | A | A20 | 0.5 | 626 | 1.5 | — | — | DHT | 0.1 | 2 |
| 8 | A | A20 | 0.5 | 626 | 0.75 | 412s | 0.75 | DHT | 0.1 | 2 |
| 9 | A | A20 | 0.3 | 626 | 0.9 | 412s | 0.9 | DHT | 0.1 | 2.1 |
| 10 | A | A20 | 0.14 | 626 | 0.43 | 412s | 0.43 | DHT | 0.1 | 1 |
| 11 | A | A20 | 0.3 | 626 | 0.9 | 412s | 0.9 | Drapex | 0.1 | 2.1 |
| 12 | A | A20 | 0.3 | 626 | 0.9 | 412s | 0.9 | CaSt | 0.1 | 2.1 |
| 13 | A | A20 | 0.3 | 626 | 0.9 | 412s | 0.9 | CaO | 0.1 | 2.1 |
| 14 | A | A20 | 0.3 | 626 | 0.9 | 412s | 0.9 | ZnO | 0.1 | 2.1 |
| 15 (comp) | B | A20 | 0.3 | 626 | 1.8 | — | — | DHT | 0.1 | 2.1 |
| 16 | B | A20 | 0.3 | 626 | 0.9 | 412s | 0.9 | DHT | 0.1 | 2.1 |
| 17 | B | IC14 | 0.3 | 626 | 0.9 | 412s | 0.9 | DHT | 0.1 | 2.1 |
| 18 | B | A20 | 0.21 | 626 | 0.64 | 412s | 0.64 | DHT | 0.1 | 1.5 |
| 19 | B | A20 | 0.17 | 626 | 0.51 | 412s | 0.51 | DHT | 0.1 | 1.2 |
| 20 | B | A20 | 0.14 | 626 | 0.43 | 412s | 0.43 | DHT | 0.1 | 1 |
| 21 | B | A20 | 0.3 | 626 | 0.9 | 412s | 0.9 | Drapex | 0.1 | 2.1 |
| 22 | B | A20 | 0.3 | 626 | 0.9 | 412s | 0.9 | CaO | 0.1 | 2.1 |

For each sample, discolouration, skin formation and gel formation were determined.

To measure discolouration, samples containing hot melt adhesive A were exposed to a temperature of 170° C. Results were taken after 0 days (unaged), 1 day and 7 days of exposure. Samples containing hot melt adhesive B were exposed to a temperature of 200° C. Results were taken after 0 days (unaged), 1 day and 3 days of exposure. Discolouration was determined by visual inspection. The results are displayed as integers, the higher the integer, the more discolouration observed. A result of 0 indicates that no discolouration was observed.

The results for discolouration are shown in Table 3.

TABLE 3

| | Discolouration | | | |
|---|---|---|---|---|
| Sample | 0 days | 1 day | 3 days | 7 days |
| 1 | 0 | 4 | — | 9 |
| 2 | 0 | 5 | — | 9 |
| 3 | 0 | 5 | — | 9 |
| 4 | 0 | 1 | — | 9 |
| 5 | 0 | 4 | — | 9 |
| 6 | 0 | 1 | — | 8 |
| 7 | 0 | 1 | — | 6 |
| 8 | 0 | 1 | — | 5 |
| 9 | 0 | 1 | — | 5 |
| 10 | 0 | 1 | — | 5 |
| 11 | 0 | 1 | — | 7 |
| 12 | 0 | 1 | — | 8 |
| 13 | 0 | 1 | — | 4 |
| 14 | 0 | 1 | — | 5 |
| 15 | 3 | 4 | 5 | — |
| 16 | 3 | 4 | 5 | — |
| 17 | 3 | 4 | 7 | — |
| 18 | 3 | 4 | 7 | — |
| 19 | 3 | 4 | 7 | — |
| 20 | 3 | 4 | 7 | — |
| 21 | 3 | 4 | 9 | — |
| 22 | 3 | 4 | 8 | — |

To test for skin formation, samples containing hot melt adhesive A were heated to a temperature of 170° C. and results were taken after 3 days and after 7 days of heating. Samples containing hot melt adhesive B were heated to a temperature of 200° C. and results were taken after 3 days of heating.

Skin formation was determined by visual inspection. If a skin had formed on the stabilised hot melt adhesive composition then the result recorded was 'YES', if no skin had formed then the result recorded was 'NO'.

Gel formation was determined using a method varied from ASTM D4499. Samples containing hot melt adhesive A were heated to a temperature of 170° C. and results were taken after 3 days and after 7 days of heating. Samples containing hot melt adhesive B were heated to a temperature of 200° C. and results were taken after 3 days of heating.

A fibre of the stabilised hot melt adhesive was removed from the sample and visually assessed to see whether any gel formations were present. If any gel formations were detected in the stabilised hot melt adhesive then gel formation was deemed to have occurred and a result of 'YES' was recorded. If no gel formations were observed then a result of 'NO' was recorded.

In addition to the above properties, viscosity was also measured for samples 15 to 20. The viscosity of the samples was determined using a Brookfield viscometer with spindle S27 at a speed of 12 RPM according to the ASTM D 4499-07 test method. The samples were heated to 200° C. and viscosity measurements were taken after 0 days (unaged) and after 3 days of heating.

The results for skin formation, gel formation and viscosity are shown in Table 4.

TABLE 4

| Sample | Skin Formation | | Gel Content | | Viscosity (mPa s) | | Viscosity change (%) |
|---|---|---|---|---|---|---|---|
| | 3 days | 7 days | 3 days | 7 days | 0 days | 3 days | |
| 1 | NO | NO | NO | NO | — | — | — |
| 2 | NO | NO | NO | NO | — | — | — |
| 3 | NO | NO | NO | NO | — | — | — |
| 4 | NO | NO | NO | NO | — | — | — |
| 5 | NO | NO | NO | NO | — | — | — |
| 6 | NO | NO | NO | NO | — | — | — |
| 7 | NO | NO | NO | NO | — | — | — |
| 8 | NO | NO | NO | NO | — | — | — |
| 9 | NO | NO | NO | NO | — | — | — |
| 10 | NO | NO | NO | NO | — | — | — |
| 11 | NO | NO | NO | NO | — | — | — |
| 12 | NO | NO | NO | NO | — | — | — |
| 13 | NO | NO | NO | NO | — | — | — |
| 14 | NO | NO | NO | NO | — | — | — |
| 15 | YES | — | NO | — | 11494 | 11228 | 2.30 |
| 16 | NO | — | NO | — | 10940 | 11108 | 1.50 |
| 17 | NO | — | NO | — | 11128 | 10482 | 5.80 |
| 18 | NO | — | NO | — | 11202 | 10468 | 6.55 |
| 19 | NO | — | NO | — | 11194 | 9682.8 | 13.50 |
| 20 | NO | — | NO | — | 11140 | 8624.8 | 22.58 |
| 21 | NO | — | NO | — | — | — | — |
| 22 | NO | — | NO | — | — | — | — |

From the results it can be seen that the stabilising composition of the present invention significantly improves the colour retention of the stabilised hot melt adhesive compared to stabilising compositions containing only a phenolic antioxidant and/or a phosphite antioxidant.

The results also reveal that the addition of an acid scavenger to the stabilising composition of the present invention further improves colour retention of the stabilised hot melt adhesive.

Regarding skin formation, the results show that the presence of the sulphur-containing antioxidant in the stabilising composition reduces skin formation in the stabilised hot melt adhesive. This particularly highlighted by the results for samples 15 (comparative) and 16.

The results relating to viscosity show that varying the different dosing levels of each antioxidant has an effect on the viscosity retention.

Example 2

Different stabilising compositions were blended into unstabilised hot melt adhesives to form stabilised hot melt adhesive compositions. The unstabilised hot melt adhesive was a polypropylene-based low viscous hot melt adhesive (A).

Table 5 shows the antioxidants present in the stabilising compositions tested.

TABLE 5

| Phenolic AO | Phosphite AO | Sulphur AO | Acid Scavenger |
|---|---|---|---|
| A20 Anox$^{RTM}$ 20 | 626 Ultranox$^{RTM}$ 626 | 412s Naugard$^{RTM}$ 412s | DHT DHT-4A |
| A70 Anox$^{RTM}$ 70 | 240 Alkanox$^{RTM}$ 240 | 565 Irganox$^{RTM}$ 565 | |
| | | A70 Anox$^{RTM}$ 70 | |

Table 6 shows the various stabilised hot melt adhesives that were prepared. Samples 25 and 26 were comparative tests.

TABLE 6

| Sample | Unstabilized HMA | Phenolic AO Stabiliser | % | Phosphite AO Stabiliser | % | Sulphur AO Stabiliser | % | Acid Scavenger Stabiliser | % | % AO (excluding acid scavenger) |
|---|---|---|---|---|---|---|---|---|---|---|
| 23 | A | A20 | 0.14 | 626 | 0.43 | 412s | 0.43 | DHT | 0.1 | 1 |
| 24 | A | A20 | 0.14 | 240 | 0.43 | 412s | 0.43 | DHT | 0.1 | 1 |
| 25 (comp) | A | A20 | 0.14 | 626 | 0.43 | 565 | 0.43 | DHT | 0.1 | 1 |
| 26 (comp) | A | A70 | 0.57 | 626 | 0.43 | — | — | DHT | 0.1 | 1 |
| 27 | A | A70 | 0.14 | 626 | 0.43 | 412s | 0.43 | DHT | 0.1 | 1 |

For each of the samples 23 to 27, discolouration was determined.

To measure discolouration, each sample was exposed to a temperature of 170° C. results were taken after 0 days (unaged), 1 day and 7 days of exposure. Discolouration was determined by visual inspection. The results are displayed as integers, the higher the integer, the more discolouration observed. A result of 0 indicates that no discolouration was observed.

The results for discolouration are shown in Table 7.

TABLE 7

| Sample | Discolouration | | |
|---|---|---|---|
|  | 0 days | 1 day | 7 days |
| 23 | 0 | 1 | 5 |
| 24 | 0 | 3 | 9 |
| 25 (comp) | 0 | 3 | 5 |
| 26 (comp) | 0 | 1 | 8 |
| 27 | 0 | 1 | 5 |

From the discolouration results for samples 23 and 24 it can be seen that substituting Ultranox® 626 with Alkanox® 240 results in greater discolouration of the stabilised hot melt adhesive composition after 1 and 7 days. This suggests that a stabilising composition comprising a fully hindered triaryl phosphite may be less effective at stabilising a hot melt adhesive compared to a stabilising composition comprising an alkylaryl phosphite.

The results of samples 23 and 25 highlight the beneficial effects of using a sulphur-containing antioxidant in accordance with the present invention. As can be seen from the discolouration results, comparative sample 25 (using Irganox® 565 as the sulphur-containing antioxidant) shows greater discolouration after 1 day compared to sample 23.

Irganox® 565 contains sulphur atoms directly bonded to an aromatic group, whereas the sulphur-containing antioxidants of the present invention, for example Naugard® 412s, contain a sulphur group having the formula —$CH_2$—$(S)_x$—$CH_2$—, wherein x=1 or 2, and wherein neither of the —$CH_2$— groups is directly bonded to an aromatic group.

The results from samples 26 and 27 highlight the importance of having stabilising component (c) present in the stabilising composition. Sample 27, having Naugard® 412s as stabilising component (c), shows less discolouration after 7 days compared to comparative sample 26, which does not contain stabilising component (c).

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A stabilising composition for hot melt adhesives, comprising:
   (a) a first stabilising component comprising at least one phenolic antioxidant;
   (b) a second stabilising component comprising at least one phosphite antioxidant;
   (c) a third stabilising component comprising at least one antioxidant containing a sulphur group having the formula —$CH_2$—$(S)_x$—$CH_2$—, wherein x=1 or 2, and wherein neither of the —$CH_2$— groups is directly bonded to an aromatic group; and
   (d) a fourth stabilising component comprising at least one acid scavenger.

2. A stabilising composition according to claim 1, wherein x=1.

3. A stabilising composition according to claim 1, wherein stabilising component (a) comprises one or more hindered phenolic antioxidants.

4. A stabilising composition according to claim 3, wherein each hindered phenolic antioxidant comprises tetrakismethylene(3,5-di-t-butyl-4-hydroxyhydrocinnamate) methane; 2,2'-thiodiethylene bis[3(3,5-di-t-butyl-4-hydroxyphenyl)propionate]; C13-C15 linear and branched alkyl esters of 3-(3'5'-di-t-butyl-4'-hydroxyphenyl) propionic acid; octadecyl 3-(3',5'-di-t-butyl-4'-hydroxyphenyl) propionate; 1,3,5-tris(3,5-di-t-butyl-4-hydroxybenzyl) isocyanurate; 1,3,5-trimethyl-2,4,6-tris(3,5-di-t-butyl-4-hydroxybenzyl) benzene; N,N'-hexamethylene bis[3-(3,5-di-t-butyl-4-hydroxyphenyl)propionamide]; 1,2-bis(3,5-di-t-butyl-4-hydroxyhydrocinnamoyl)hydrazine; C9-C11 linear and branches alkyl esters of 3-(3',5'-di-t-butyl-4'-hydroxyphenyl)propionic acid; triethyleneglycol-bis-[3-(3-t-butyl-4-hydroxy-5-methylphenyl)propionate]; the butylated reaction product of p-cresol and dicyclopentadiene; 2,2'-methylenebis(6-t-butyl-4-methylphenol); 2,2'-ethylidenebis[4,6-di-t-butylphenol]; butylated hydroxytoluene; or compatible mixtures of two or more thereof.

5. A stabilising composition according to claim 4, wherein the hindered phenolic antioxidant comprises tetrakismethylene(3,5-di-t-butyl-4-hydroxyhydrocinnamate) methane.

6. A stabilising composition according to claim 1, wherein stabilising component (b) comprises one or more organophosphite antioxidants.

7. A stabilising composition according to claim 6, wherein each organophosphite antioxidant comprises a non-hindered triaryl phosphite, a low hindered triaryl phosphite, an alkylaryl phosphite or a trialkyl phosphite.

8. A stabilising composition according to claim 6, wherein each organophosphite antioxidant does not comprise a fully hindered triaryl phosphite.

9. A stabilising composition according to claim 6, wherein each organophosphite antioxidant comprises bis(2,4-di-t-butylphenyl)pentaerythritol diphosphite; 2,4,6-tri-tert-butylphenyl-2-butyl-2-ethyl-1,3-propanediol phosphite; tris(2,4-di-t-butylphenyl)phosphite; tetrakis (2,4-di-t-butylphenyl)4,4'-biphenylene diphosphonite; tris(4-n-nonylphenyl) phosphite; tris(mono-nonylphenyl)-phosphite; distearylpentaerythritol diphosphite; bis(2,4-dicumylphenyl) pentaerythritol diphosphite; Phoshorous acid, mixed 2,4-bis(1,1-dimethylpropyl)phenyl and 4-(1,1-dimethylpropyl)phenyl triesters; tris(dipropyleneglycol) phosphite, $C_{18}H_{39}O_9P$; poly(dipropylene glycol) phenyl phosphite; diphenyl isodecyl phosphite, $C_{22}H_{31}O_3P$; phenyl diisodecyl phosphite; heptakis (dipropyleneglycol) triphosphite; bis(2,6-di-tert-butyl-4-methylphenyl)pentaerythritol diphosphite; or compatible mixtures of two or more thereof.

10. A stabilising composition according to claim 9, wherein the organophosphite antioxidant comprises bis(2,4-di-t-butylphenyl)pentaerythritol diphosphite.

11. A stabilising composition according to claim 1, wherein stabilising component (c) comprises one or more thioesters.

12. A stabilising composition according to claim 11, wherein the or each thioester comprises dilauryl-3,3'-thiodipropionate; distearyl-3,3'-thiodipropionate; ditridecylthiodipropionate; 2,2'-thiodiethylene bis[3(3,5-di-t-butyl-4-hydroxyphenyl)propionate]; dimyristyl thiodipropionate; distearyl-disulfide; or compatible mixtures of two or more thereof.

13. A stabilising composition according to claim 11, wherein the thioester comprises pentaerythritol tetrakis (β-laurylthiopropionate).

14. A stabilising composition according to claim 1, wherein the acid scavenger is selected from epoxidised oils, metal salts of fatty acids, metal oxides, metal hydroxides, metal carbonates, metal salts and hydrotalcite compounds.

15. A stabilising composition according to claim 14, wherein the acid scavenger comprises epoxidised soy bean oil.

16. A stabilising composition according to claim 14, wherein the acid scavenger comprises calcium stearate.

17. A stabilising composition according to claim 14, wherein the acid scavenger comprises a magnesium aluminium hydroxide carbonate hydrate.

18. A stabilising composition according to claim 14, wherein the acid scavenger comprises calcium oxide, zinc oxide, calcium hydroxide, calcium carbonate, calcium lactate or zinc octanoate.

19. A stabilising composition according to claim 1, wherein the stabilising composition is in solid form.

20. A stabilising composition according to claim 1, wherein the stabilising composition is in liquid form.

21. A stabilised hot melt adhesive comprising a polymeric base material and a stabilising composition comprising:
   (a) a first stabilising component comprising at least one phenolic antioxidant;
   (b) a second stabilising component comprising at least one phosphite antioxidant;
   (c) a third stabilising component comprising at least one antioxidant containing a sulphur group having the formula $-CH_2-(S)_x-CH_2-$, wherein x=1 or 2, and wherein neither of the $-CH_2-$ groups is directly bonded to an aromatic group; and
   (d) a fourth stabilising component comprising at least one acid scavenger.

22. A stabilised hot melt adhesive according to claim 21, wherein x=1.

23. A stabilised hot melt adhesive according to claim 21, wherein stabilising component (a) is present in an amount of from about 0.1% to about 1% by weight of stabilised hot melt adhesive.

24. A stabilised hot melt adhesive according to claim 23, wherein stabilising component (a) is present in an amount of from about 0.2% to about 0.46 by weight of stabilised hot melt adhesive.

25. A stabilised hot melt adhesive according to claim 21, wherein stabilising component (b) is present in an amount of from about 0.1% to about 1% by weight of stabilised hot melt adhesive.

26. A stabilised hot melt adhesive according to claim 25, wherein stabilising component (b) is present in an amount of from about 0.4% to about 0.7% by weight of stabilised hot melt adhesive.

27. A stabilised hot melt adhesive according to claim 21, wherein stabilising component (c) is present in an amount of from about 0.1% to about 1% by weight of stabilised hot melt adhesive.

28. A stabilised hot melt adhesive according to claim 27, wherein stabilising component (c) is present in an amount of from about 0.4% to about 0.7% by weight of stabilised hot melt adhesive.

29. A stabilised hot melt adhesive according to claim 21, wherein the acid scavenger is present in an amount of from about 100 to about 5000 ppm of the stabilised hot melt adhesive.

30. A stabilised hot melt adhesive according to claim 29, wherein the acid scavenger is present in an amount of from about 900 to about 1100 ppm of the stabilised hot melt adhesive.

31. A stabilised hot melt adhesive according to claim 21, wherein the polymeric base material comprises a polyolefin comprising a homopolymer of ethylene, propylene, butylene or a higher alkene; a random copolymer of ethylene, propylene or butylene; a block copolymer of ethylene, propylene or butylene; or mixtures thereof.

32. A stabilised hot melt adhesive according to claim 31, wherein the polymeric base material comprises a polypropylene homopolymer or copolymer.

33. A stabilised hot melt adhesive according to claim 31, wherein the stabilised hot melt adhesive is substantially free from anti-gel agents.

34. A stabilised hot melt adhesive according to claim 21, for use in packaging and converting applications.

* * * * *